(12) United States Patent
Wang

(10) Patent No.: US 7,964,099 B2
(45) Date of Patent: Jun. 21, 2011

(54) WATER FILTERING DEVICE

(76) Inventor: Te-Hsing Wang, Taichung (TW)

( * ) Notice: Subject to any disclaimer, the term of this patent is extended or adjusted under 35 U.S.C. 154(b) by 478 days.

(21) Appl. No.: 12/288,668

(22) Filed: Oct. 22, 2008

(65) Prior Publication Data

US 2010/0096314 A1 Apr. 22, 2010

(51) Int. Cl.
*B01D 24/16* (2006.01)
*B01D 27/00* (2006.01)
*B01D 24/18* (2006.01)
*B01D 29/56* (2006.01)

(52) U.S. Cl. ......... 210/232; 210/282; 210/438; 210/446
(58) Field of Classification Search ................... 210/232, 210/263, 266, 282, 437, 438, 446, 450
See application file for complete search history.

(56) References Cited

U.S. PATENT DOCUMENTS

| | | | | |
|---|---|---|---|---|
| 2,886,176 A | * | 5/1959 | Paton | 210/223 |
| 4,869,822 A | * | 9/1989 | Kamei et al. | 210/321.79 |
| 5,674,393 A | * | 10/1997 | Terhune et al. | 210/315 |
| 6,024,229 A | * | 2/2000 | Ayers | 210/443 |
| 6,758,969 B2 | * | 7/2004 | Caiozza | 210/223 |
| 7,247,245 B1 | * | 7/2007 | Proulx et al. | 210/767 |
| 7,294,266 B2 | * | 11/2007 | Vetterli | 210/282 |
| 2010/0051528 A1 | * | 3/2010 | Derstler et al. | 210/232 |

FOREIGN PATENT DOCUMENTS

| | | | |
|---|---|---|---|
| GB | 2094652 A | * | 9/1982 |
| WO | WO 91-10493 A1 | * | 7/1991 |

* cited by examiner

*Primary Examiner* — Fred Prince
(74) *Attorney, Agent, or Firm* — Charles E. Baxley

(57) ABSTRACT

A water filtering device includes a casing having a first space defined therein and an inner part is received in the first space. The casing includes an inlet at top thereof and an outlet at a lower end thereof. The inner part includes a cover and an inner tube is located therein. A second space is defined between the inner tube and the inner periphery of the inner part. Filtering particles are received in the second space. The inner part includes apertures defined through a lower end thereof and communicating with the first and second spaces. Water enters into the first space form the inlet and enters into the second space via the apertures and is filtered by the filtering particles. The filtered water flows over the open top of the inner tube and enters into the inner tube and flows out from the outlet of the casing.

4 Claims, 7 Drawing Sheets

WATER FILTERING DEVICE

FIELD OF THE INVENTION

The present invention relates to a water filtering device and the water is filled with the space where the filtering particles are received before flowing into the outlet.

BACKGROUND OF THE INVENTION

A conventional water filtering device filters water from top to bottom or from outside to inside by two to five layers of filtering. Filtering particles are used to filter the water and cooperated with resin which might be slightly dissolved and stock the filtering net so that the volume of filtered water becomes smaller after a period of time of use.

The present invention intends to provide an improved water filtering device which includes two spaces and one which is filed with filtering particles, the water has to fill the two spaces before it flows into the outlet. By this way, the volume of the filtered water can be kept at a controllable level.

SUMMARY OF THE INVENTION

The present invention relates to a water filtering device which comprises a casing having a first space defined therein and an engaging part is connected to a lower end of the casing. The engaging part includes an outlet defined centrally therethrough and a filtering unit is received in the outlet. A first cover is connected to an open top of the casing and an inlet is defined through the first cover. An inner part is located in the first space of the casing and is connected to the engaging part of the casing and located on the filtering unit. The inner part has a second space in which an inner tube is located which communicates with the filtering unit and the outlet. A plurality of apertures are defined through the lower end of the inner part and communicate with the second space in which filtering particles are received. A filtering net is connected to an open top of the second space and an open top of the inner tube. A second cover is mounted to the open top of the inner part and has a plurality of connection pieces on a top thereof. Each connection piece is connected with a separation piece. A filtering agent is connected to the connection pieces and rested on the separation pieces so as to define a gap between the second cover the filtering agent. The filtering agent includes multiple passages defined therethrough.

The primary object of the present invention is to provide a water filtering device which includes two spaces and one which is filed with filtering particles, the water has to fill the two spaces before it flows into the outlet. By this way, the volume of the filtered water can be kept at a controllable level.

Another object of the present invention is to provide a water filtering device wherein the filtering particles are merged in the water even when the water does not flow out from the outlet. This ensures that the filtering particles do not adhere to each other due to lack of water.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
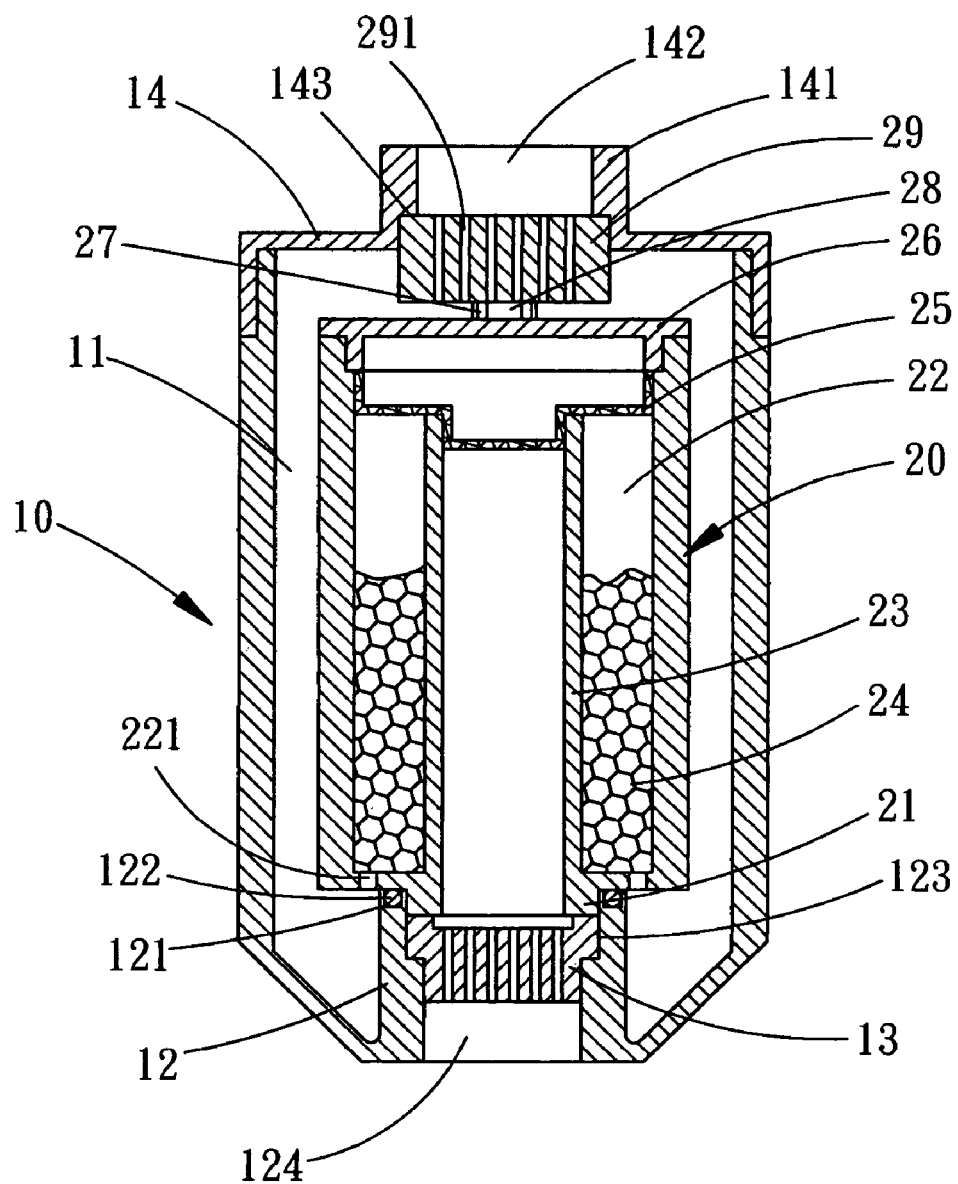
FIG. 1 is a cross sectional view to show the water filtering device of the present invention.
Figure 2:
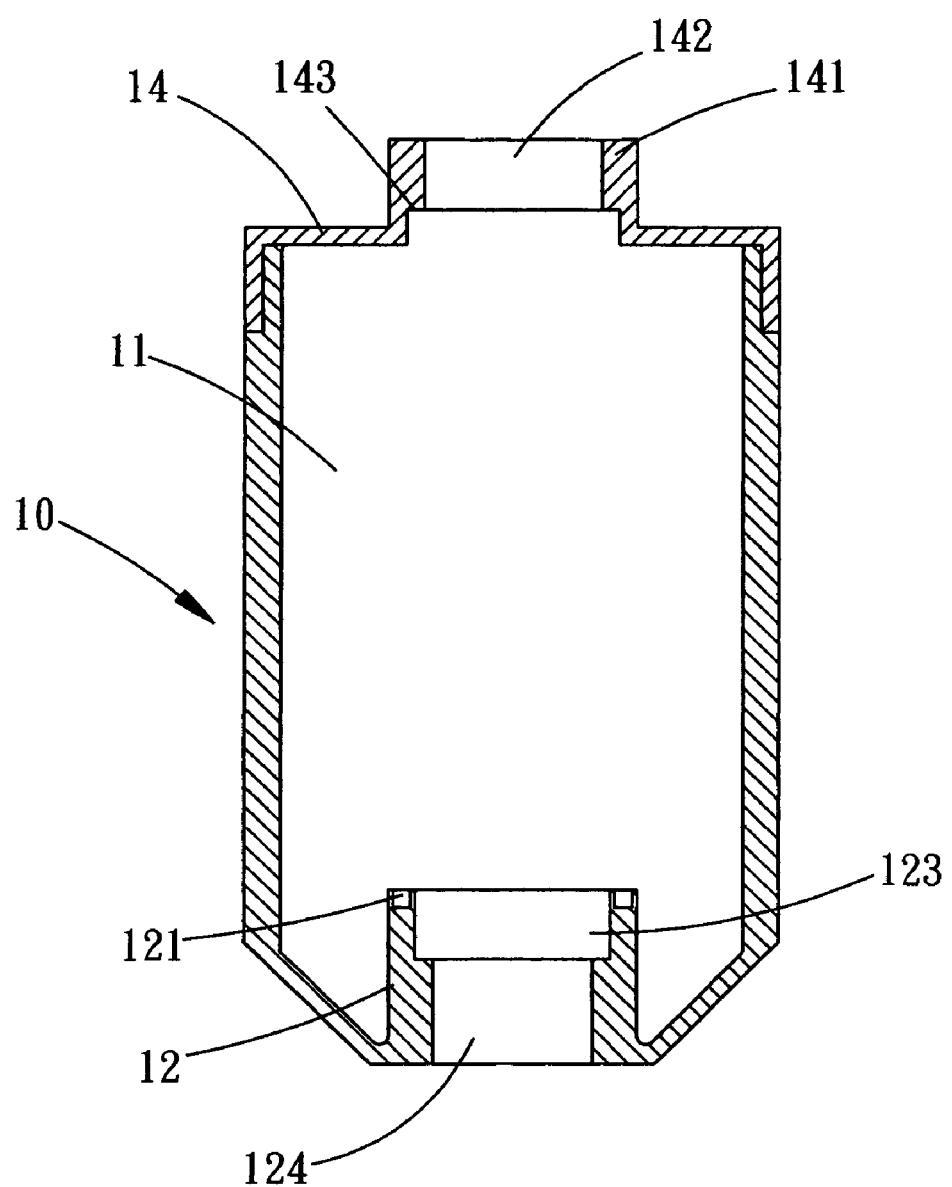
FIG. 2 is a cross sectional view to show the casing of the water filtering device of the present invention.
Figure 3:
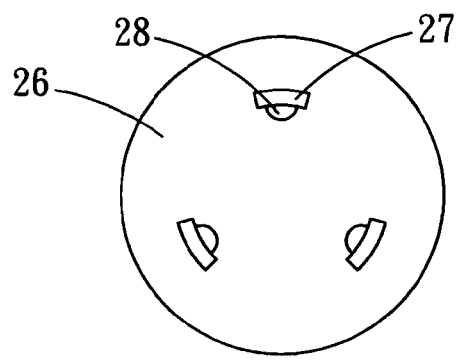
FIG. 3 is a top view to show the cover on the inner part of the water filtering device of the present invention.
Figure 4:
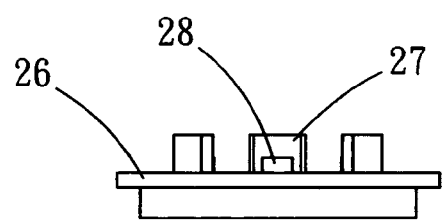
FIG. 4 is a side view to show the cover on the inner part of the water filtering device of the present invention.
Figure 5:
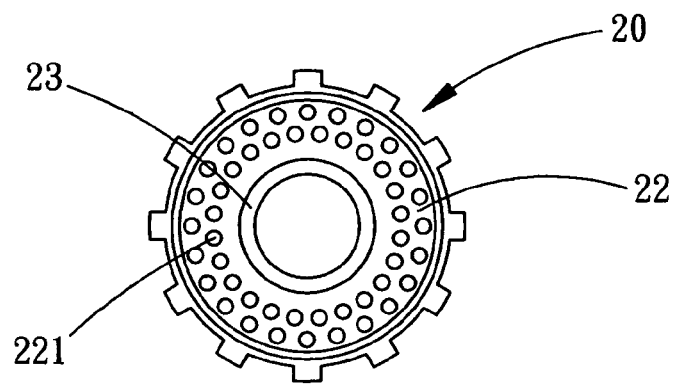
FIG. 5 is a top view to show the inner part of the water filtering device of the present invention.
Figure 6:
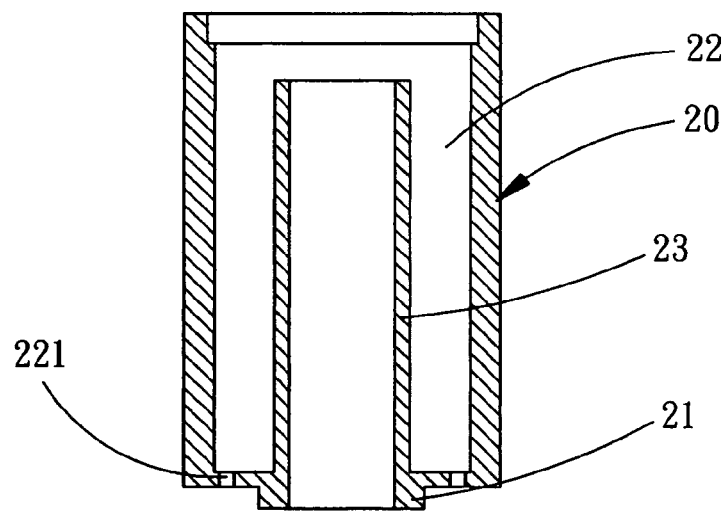
FIG. 6 is a cross sectional view of the inner part of the water filtering device of the present invention.

Referring to FIGS. 1 to 7, the water filtering device of the present invention comprises a casing 10 having an open top and a first space 11 is defined in the casing 10. An engaging part 12 is connected to a lower end of the casing 10 and includes an engaging recess 121 defined in a top thereof so that an O-ring 122 is engaged with the engaging recess 121. The engaging part 12 has an outlet 124 defined centrally therethrough and an annular recess 123 is defined in an inner periphery of the outlet 124. A filtering unit 13 is engaged with the annular recess 123. A first cover 14 is connected to the open top of the casing 10 and has a tubular portion 141 extending from a top thereof, an inlet 142 is defined through the tubular portion 141 and communicates with first space 11 of the casing 10. A reception recess 143 is defined in an inner periphery of the inlet 142.

An inner part 20 is located in the first space 11 of the casing 10 and includes an engaging tube 21 extending from a lower end thereof. The engaging tube 21 is engaged with the annular recess 123 of the engaging part 12 and located on the filtering unit 13. The O-ring 122 seals the conjunction portion between the engaging part 12 and the inner part 20. The inner part 20 has a second space 22 in which an inner tube 23 is located. The inner tube 23 includes an open top and a open bottom and is located corresponding to the filtering unit 13 and the outlet 124. A plurality of apertures 221 are defined through the lower end of the inner part 20 and located around the inner tube 23. The apertures 221 communicate with the first and second spaces 11, 22. A plurality of filtering particles 24 are received in the second space 22. A filtering net 25 is connected to the open top of the second space 22 and the open top of the inner tube 23. A second cover 25 is mounted to the open top of the inner part 20 and has a plurality of connection pieces 27 on a top thereof. Each connection piece 27 is connected with a separation piece 28. A filtering agent 29 is connected to the connection pieces 27 and rested on the separation pieces 28 so as to define a gap between the second cover the filtering agent 29. The filtering agent 29 includes multiple passages 291 defined therethrough. The top of the filtering agent 29 is engaged with the reception recess 143 of the tubular portion 141.

Figure 7:
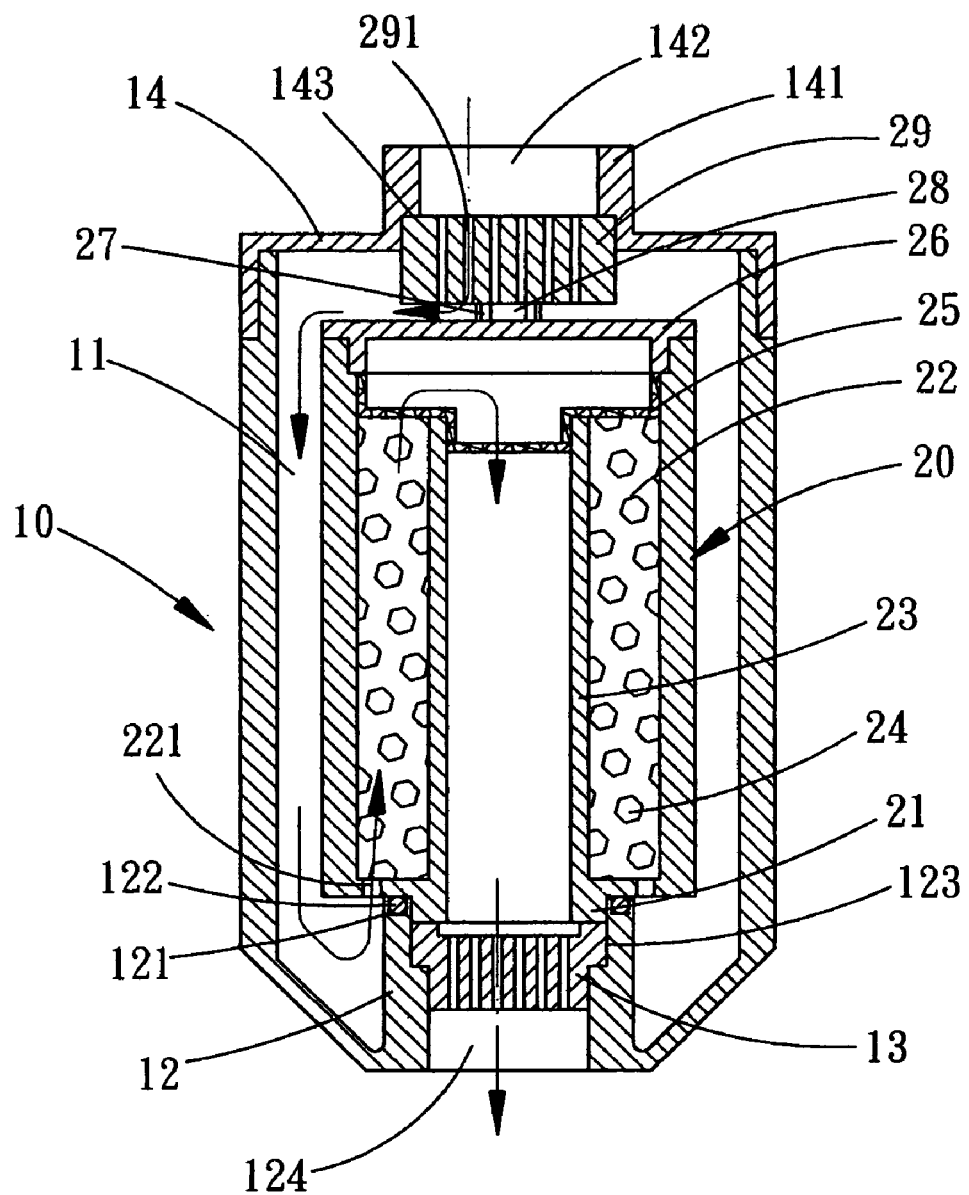
FIG. 7 shows the direction of the water flow in the water filtering device of the present invention.

Referring to FIG. 7, water is introduced into the casing 10 from the inlet 142 and flows through the passages 291 of the filtering agent 29 and fills the first space 11. The water in the first space 11 enters into the second space 22 via the apertures 221 and passes through the filtering particles 24. When the water level reaches the open top of the inner tube 23, the water passes through the filtering net 25 and flows into the inner tube 23. The water passes through the filtering unit 13 and flows out from the outlet 124.

It is noted that the water has to fill the first and second spaces 11, 22 before it comes out from the outlet 124. Therefore, the volume of the filtered water can be kept at a certain amount. Furthermore, the filtering particles 24 are merged in the water even when the water does not flow out from the outlet. This ensures that the filtering particles 24 do not adhere to each other due to lack of water.

Figure 8:
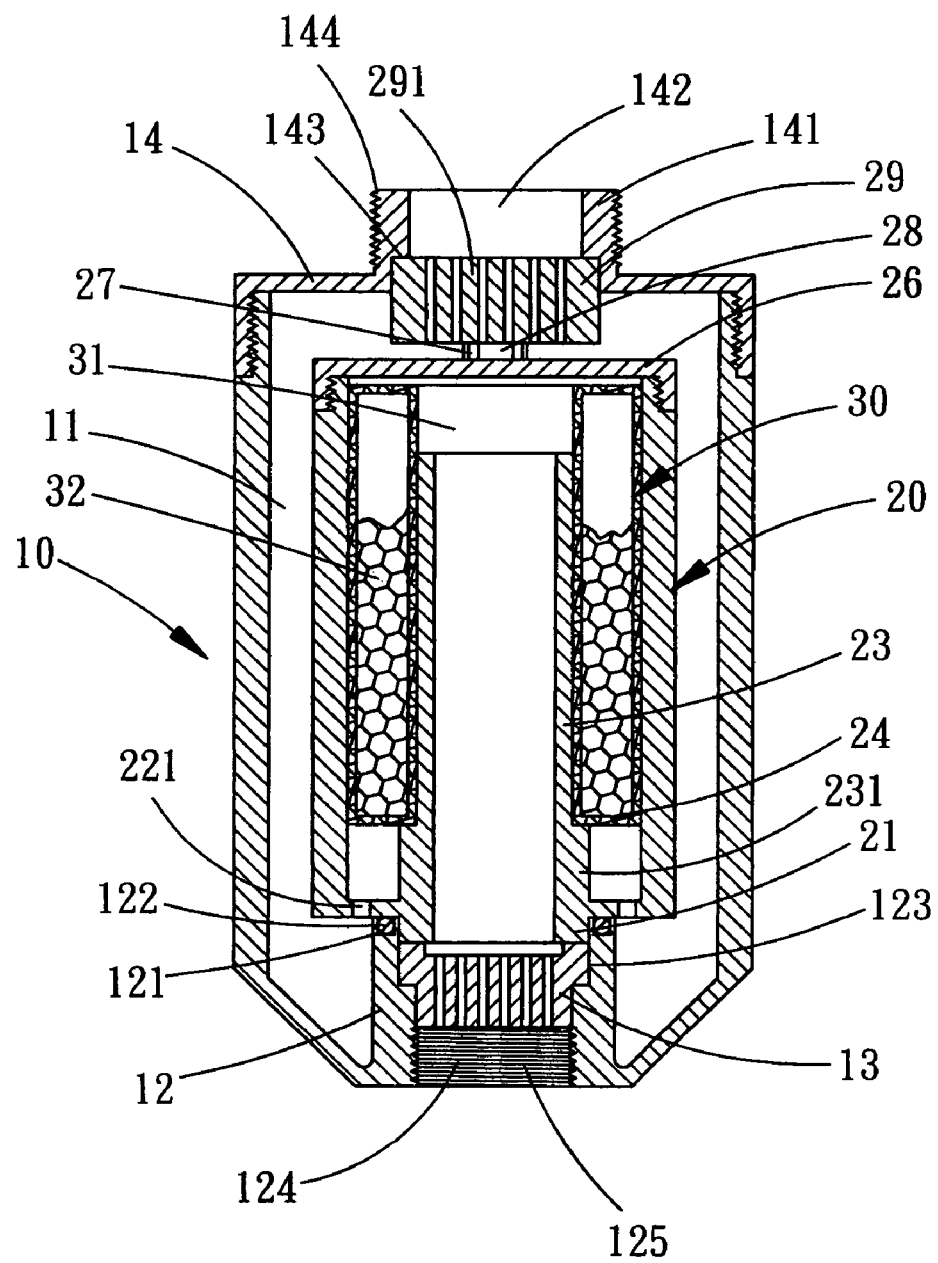
FIG. 8 is a second embodiment of the water filtering device of the present invention.

As shown in FIG. 8 which shows a second embodiment of the water filtering device, wherein a shoulder portion 231 extends from an outer periphery of the inner tube 23 and is located within the second space 22. A net member 30 is located in the second space 22 and rested on a top of the shoulder portion 231. The net member 30 has a through hole 31 defined centrally therethrough which is located corresponding to the inner tube 23. Multiple filtering particles 32 are filled in the net member 30. The first cover 14 has outer threads 144 defined in an outer periphery of the tubular portion 141 and inner threads 125 are defined in an inner periphery of the outlet 124. The outer threads 144 allow the water filtering device to be easily connected to a faucet or water source, and the inner threads 125 are convenient to be connected with a hose or the like to collect the filtered water. The first and second covers 14, 26 can also be threadedly connected to the casing 10 and the inner part 20. The net member 30 allows the user to replace the filtering particles 32 by pulling the net member 30 out from the casing 10. This arrangement can replace the filtering particles 32 easily and neat.

Figure 9:
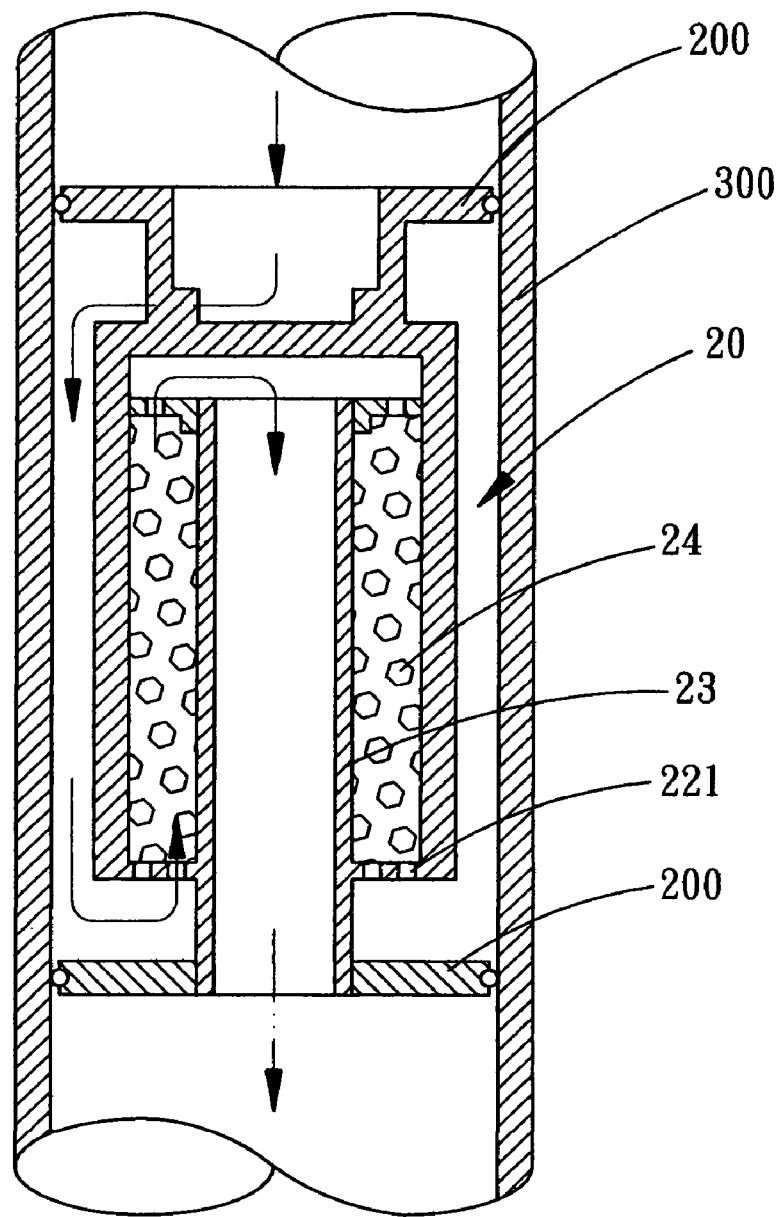
FIG. 9 shows that only the inner part of the water filtering device of the present invention is inserted into a tube to filter water.

FIG. 9 shows a third embodiment of the water filtering device, wherein the casing 10, the engaging part 12 and the first cover 14 are omitted, the inner part 20 is cooperated with two fixing heads 200 which are connected to two ends of the inner part 20. Each fixing heads 200 is equipped with an O-ring. The inner tube 23 extends through the fixing head 200 at the lower end thereof. The inner part 20 together with the two fixing heads 200 are inserted into a pipe 300 and the O-rings on the fixing heads 200 are in contact with an inside of the pipe 300. Water enters from the recess at the top of the fixing head 200 at the top end of the inner part 20 and flows through radial holes of the fixing head 200 at the top end of the inner part 20 and then enters into the inner part 20 via apertures 221 and filtered by the filtering particles 24. When the water level reaches the open top of the inner tube 23, the water flows into the inner tube 23 via the open top of the inner tube 23 and flows out via the fixing head 200 at the lower end of the inner part 20.

While we have shown and described the embodiment in accordance with the present invention, it should be clear to those skilled in the art that further embodiments may be made without departing from the scope of the present invention.

What is claimed is:
1. A water filtering device comprising:
a casing having a first space defined therein and an engaging part connected to a lower end of the casing, the engaging part having an outlet defined centrally therethrough and an annular recess defined in an inner periphery of the outlet, a filtering unit engaged with the annular recess, a first cover connected to an open top of the casing and having a tubular portion through which an inlet is defined, a reception recess defined in an inner periphery of the inlet, and
an inner part located in the first space of the casing and having an engaging tube extending from a lower end thereof, the engaging tube engaged with the annular recess of the engaging part and located on the filtering unit, the inner part having a second space in which an inner tube is located, the inner tube located corresponding to the filtering unit and the outlet, a plurality of apertures defined through the lower end of the inner part and located around the inner tube, the apertures communicating with the second space in which filtering particles are received, a filtering net connected to an open top of the second space and an open top of the inner tube, a second cover mounted to the open top of the inner part and having a plurality of connection pieces on a top thereof, each connection piece connected with a separation piece, a filtering agent connected to the connection pieces and rested on the separation pieces so as to define a gap between the second cover the filtering agent, the filtering agent including multiple passages defined therethrough, a top of the filtering agent being engaged with the reception recess of the tubular portion.

2. The water filtering device as claimed in claim 1, wherein a shoulder portion extends from an outer periphery of the inner tube and located within the second space, a net member is located in the second space and rested on a top of the shoulder portion, the net member has a through hole defined centrally therethrough which is located corresponding to the inner tube, multiple filtering particles are filled in the net member.

3. The water filtering device as claimed in claim 1, wherein the first cover has outer threads defined in an outer periphery of the tubular portion and inner threads are defined in an inner periphery of the outlet.

4. A water filtering device comprising:
an inner part having two fixing heads connected to a top end and a lower end of the inner part, each fixing heads having an O-ring mounted thereto, the fixing head at the top end having a recess defined in a top thereof and radial holes being defined through the fixing head and communicating with the recess, the inner part having an inner tube located at a center thereof and the inner tube extending through the fixing head at the lower end of the inner part, a plurality of apertures defined through the lower end of the inner part and located around the inner tube, the inner part together with the two fixing heads being inserted into a pipe and the O-rings on the fixing heads being in contact with an inside of the pipe.

* * * * *